United States Patent

[11] 3,602,911

[72] Inventor Arjeh J. Kurtzig
Short Hills, N.J.
[21] Appl. No. 887,562
[22] Filed Dec. 23, 1969
[45] Patented Aug. 31, 1971
[73] Assignee Bell Telephone Laboratories, Incorporated
Murray Hill, N.J.

[54] SINGLE WALL MAGNETIC DOMAIN PROPAGATION ARRANGEMENT
5 Claims, 3 Drawing Figs.

[52] U.S. Cl. .......... 340/174 TF, 340/174 ZB, 340/174 CC, 340/174 MC, 340/174 SR
[51] Int. Cl. .......... G11c 11/14, G11c 19/00
[50] Field of Search .......... 340/174 TF, 174 SR, 174 MC

[56] References Cited

UNITED STATES PATENTS 3,516,077 2/1970 Bobeck et al. .......... 340/174 TF
3,518,643 6/1970 Perneski .......... 340/174 TF

*Primary Examiner*—Bernard Konick
*Assistant Examiner*—Steven B. Pokotilow
*Attorneys*—R. J. Guenther and Kenneth B. Hamlin

ABSTRACT: Apparatus for moving a single wall domain utilizing the finite mobility of the domain in a sheet of magnetic material is described. The domain is moved by changing pole patterns in a magnetically soft overlay in response to alternate slow and fast reversals of the in-plane field component aligned with the direction of domain movement.

INVENTOR
A. J. KURTZIG
BY Herbert M. Shapiro
ATTORNEY

SINGLE WALL MAGNETIC DOMAIN PROPAGATION ARRANGEMENT

FIELD OF THE INVENTION

This invention relates to data processing arrangements and, more particularly, to such arrangements which comprise single wall domain propagation devices.

BACKGROUND OF THE INVENTION

Domain propagation devices are well known in the art. In most domain propagation devices, a reverse-magnetized domain, having spaced-apart leading and trailing domain walls, is moved controllably in a channel structured to prevent lateral motion of the domain. The Bell System Technical Journal (BSTJ), Volume XLVI, No. 8 Oct. 1967, at page 1901 et seq., on the other hand, describes a domain which is self-bounded by a single domain wall and is free to move in the plane of a sheet or slice of magnetic material. Movement of a domain in the latter case is in response to an offset structured magnetic field (gradient) which displaces the domain in the absence of uncontrolled expansion thereof.

A typical magnetic slice in which single wall domains are moved comprises, for example, a rare earth orthoferrite or a strontium or barium ferrite. A domain assumes the shape of a circle in the plane of a slice of these materials. The slices are characterized by a preferred direction of magnetization normal to the slice, magnetization in a first direction along that normal being considered negative (−) and the magnetization in a second direction being considered positive (+). A convenient convention is to represent a single wall domain in such a slice as an encircled plus sign where the circle represents the encompassing single wall of the domain. In connection with the ensuing discussion, the plus sign is omitted and the domain is represented solely as a circle.

There are a variety of techniques for moving single wall domains. One comprises offset conductor loops pulsed in sequence to attract domains to consecutive positions. This technique permits the greatest degree of control over individual domains. But the current-carrying requirements of such conductors necessitate conductor thicknesses difficult to realize in the minute dimensions required to manipulate, for example, domains of the order of microns.

Another technique for moving single wall domains employs a structured magnetically soft overlay on the slice in which single wall domains are moved. Such an implementation is disclosed in copending application Ser. No. 732,705, filed May 28, 1968, now U.S. Pat. No. 3,534,347 for A. H. Bobeck. The overlay generates attracting magnetic poles which move in the overlay in response to reorienting in-plane fields. The poles attract domains along a predictable path determined by the overlay pattern and the consecutive orientations of the field. This technique has the virtue that the overlay has no current-carrying requirements and so can be adapted for manipulating domains of minute size. The technique also permits the movement of all domains in a sheet without discrete wiring connections.

BRIEF DESCRIPTION OF THE INVENTION

In accordance with this invention, the finite mobility of a domain in a slice of magnetic material is turned to advantage by a field varying nonuniformly in time in the direction of movement of a domain in the slice. In one embodiment, a sequence of magnetically soft discs is aligned along an axis adjacent a surface of the slice in which a domain is moved. An illustratively constant in-plane field is generated perpendicular to the axis. In the presence of this field, a second in-plane field in the direction of propagation is reversed alternately slowly and quickly. The domain follows pole patterns, in the overlays, varying with the in-plane field.

DETAILED DESCRIPTION

Figure 1:
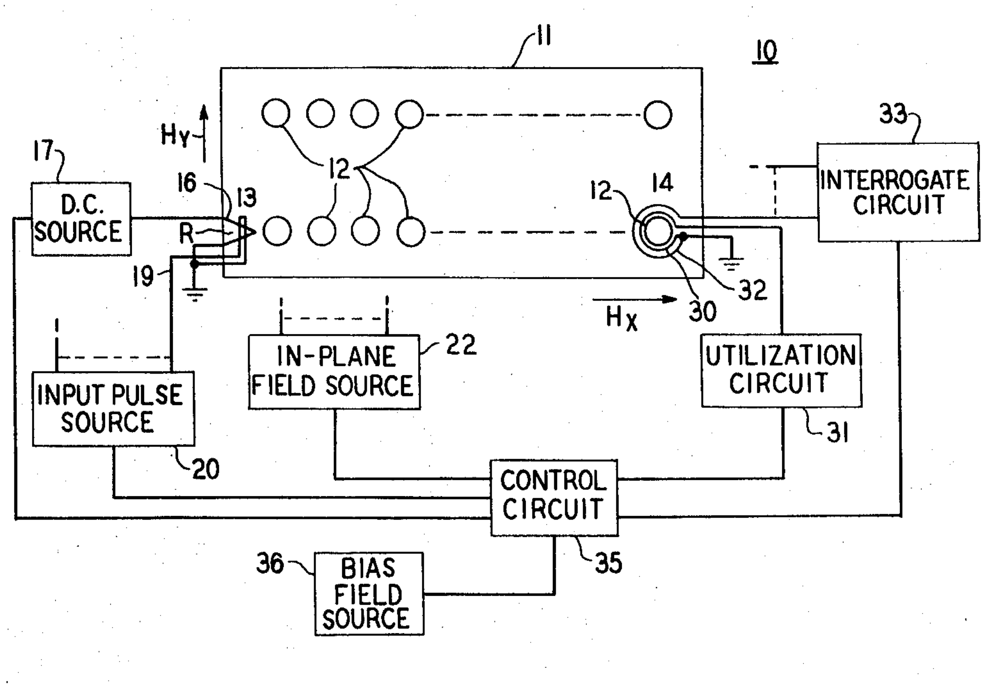
FIG. 1 is a schematic illustration of a domain propagation arrangement in accordance with this invention.

FIG. 1 shows a domain propagation arrangement 10 in accordance with this invention. The arrangement comprises a sheet or slice 11 of magnetic material in which a single wall domain can be moved. An overlay of magnetically soft material in the form of a sequence of spaced apart discs 12 is aligned between input and output positions shown at 13 and 14 in FIG. 1 respectively. The discs typically comprise permalloy vapor deposited on a suitable substrate such as glass and juxtaposed against a surface of slice 11.

A representative input arrangement is shown at 13 in FIG. 1. The arrangement includes a region R of slice 11 outlined by a conductor 16 which is connected between a DC source 17 and ground. Source 17 provides in conductor 16 a current of a polarity to drive the outlined region R to a direction of magnetization of a single wall domain that is to a direction of magnetization reversed from that of the remainder of slice 11. A second conductor 19, of hairpin geometry, intersects a tip portion of region R. Conductor 19 is connected between an input pulse source 20 and ground. In operation, source 20 pulses conductor 17 to separate the tip portion into a single wall domain for propagation. The presence of such an input pulse generates a domain which represents a binary one; the absence of a pulse results in an absent domain representing a binary zero. Information so generated is propagated along discs 12 in response to time varying in-plane fields which change magnetic pole patterns in the discs for attracting domains in the slice therebeneath.

Figure 2:
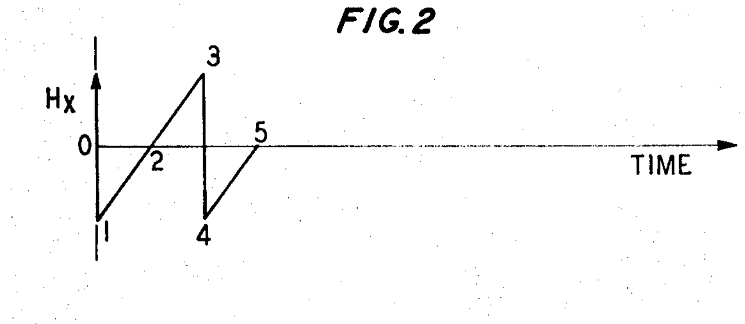
FIG. 2 is a pulse diagram of the arrangement of of FIG. 1.
Figure 3:
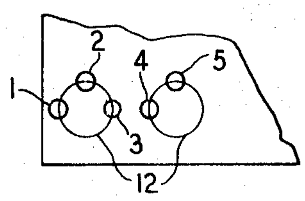
FIG. 3 is an enlarged view of a portion of the arrangement of FIG. 2.

The propagation operation is described in detail in connection with the pulse diagram of FIG. 2 and the enlargement of a portion of arrangement 10 as shown in FIG. 3. It is important in the illustrative embodiment that an in-plane field perpendicular to the propagation channel, as represented by arrow $Hy$ of FIG. 1, be present for operation in accordance with this invention. Such a field may be provided by a permanent magnet or by current-carrying coils either of which is taken to be included within the circuit represented by block 22 of FIG. 1. In addition to that perpendicular field is a second in-plane field $Hx$ aligned along the axis of movement of domains as viewed in FIG. 1. The second field is reversed alternately at slow, than fast, rates for advancing a domain along the channel defined by the discs.

FIG. 3 shows the sequential positions occupied by a single wall domain as field $Hx$ is reversed. We will assume that a domain has been generated at 13 and moves to an adjacent disc 12. The first position for a domain is designated 1 in FIG. 3. As shown in FIG. 2, field $Hx$ goes quickly negative as shown at 1 in FIG. 2. Field $Hx$ is large compared to field $Hy$. Consequently, when $Hx$ is quickly negative, positive poles accumulate at the left of each disc, attracting domains to the position (1) shown in FIG. 3.

Field $Hx$ is then reversed at a relatively slow rate as indicated in FIG. 2, permitting the field $Hy$ to generate attracting poles for moving the domain to position 2 in FIG. 3. The numeral designations in the pulse diagram of FIG. 2 are chosen to correspond to the position designations in FIG. 3 for convenience.

Field $Hx$ now goes positive, to numeral 3 of FIG. 2, at the above slow rate. Again, the magnitude of field $Hx$ is large compared to that of field $Hy$. Therefore, positive poles move to position 3 of FIG. 3 and the domain follows.

At this juncture in the operation, field $Hx$ goes quickly negative as indicated by numeral 4 in FIG. 2. Adjacent discs 12 as shown in FIG. 3 are sufficiently close, and changes in field from 2 to 3 of FIG. 2 sufficiently fast with respect to the mobility of the domain in slice 11 that field $H_y$ has little effect on the domain. Consequently, the domain moves to position 4. When field $H_x$ thereafter goes positive at the relatively slow rate, the domain moves to position 5. The terms "slowly" and "quickly" herein characterize the speed of reversal of field $H_x$ with respect to $(R/\mu\Delta H)$ where R is the radius of a disc, $\mu$ is the mobility of a domain, and $\Delta H$ is the difference in the field due to the permalloy and acting at the leading and at the trailing edges of a domain. Typical values for slow and quick reversals are 10 microseconds and 0.1 microsecond respectively. A typical value of $(R/\mu\Delta H)$ is 1 microsecond for yttrium orthoferrite.

Movement of a domain to the right along discs 12 of FIG. 1, accordingly, is achieved by alternately slow and fast reversals of the component of in-plane field aligned along the axis of domain movement in the presence of a relatively small perpendicular in-plane field component. A succession of such reversals results in the arrival of a domain at output position 14.

A representative output position comprises an overlay element typically at the terminus of a propagation channel. The element is encompassed by a conductor loop 30 connected between a utilization circuit 31 and ground. An additional conductor loop 32 also encompasses the element. Conductor 32 is connected between an interrogate circuit 33 and ground. In operation, circuit 33 pulses conductor 32 in a manner to collapse a domain in the output position. The collapse of a domain in response generates a pulse in conductor 30 for detection by utilization circuit 31.

Sources 17, 20, and 22 and circuits 31 and 33 are connected to a control circuit 35 for activation and synchronization. The various sources and circuits herein may be any such circuits capable of operating in accordance with this invention.

Overlay elements shown in FIGS. 1 and 3 are round. It is to be understood that they need not be of such geometry; oval or square geometries, for example, are adaptable in accordance with this invention. Some overlays may be employed in the absence of field $H_y$ if they are shaped to permit a domain to move thereunder during operation, an action permitted, for example, by a nonuniform overlay.

In practice, a bias field is generally supplied for constricting domains to an ideal diameter. For materials having a preferred direction of magnetization normal to the plane of slice 11 of FIG. 1, the bias field also is normal to that plane and antiparallel to the magnetization of a single wall domain. Such a field is supplied by any familiar bias field source represented by block 36 of FIG. 1.

In one embodiment of this invention, 1 mil diameter domains are moved in a slice of a samarium terbium orthoferrite 1 mil thick in the presence of overlay elements 12 3 mils in diameter and 1,000 A thick on about 4 mil centers. In this instance, $H_y$ is 5 oersteds and $H_x$ has a maximum value of 15 oersteds. Alternate reversal times for $H_x$ are 10 microseconds and 0.3 microsecond. A bias field of 25 oersteds maintains a constant domain diameter. The mobility of a domain in the slice is 1,000 cm./sec. oersteds.

It should be clear from the symmetry of the overlay that a reversal of the fast and slow reversal rates as shown in FIG. 2 causes the domains to move in an opposite direction. And, of course, a reversal of the $H_y$ and $H_x$ field values permits a domain to be moved up and down as viewed in FIG. 1.

What has been described is considered only illustrative of the principles of this invention. Therefore, many and varied modifications can be devised by those skilled in the art in accordance with those principles still with the spirit and scope of this invention.

What is claimed is:

1. A magnetic domain propagation arrangement comprising a material in which a single wall domain can be moved and having a first surface, a magnetically soft overlay adjacent said surface, said overlay comprising a plurality of elements aligned with an axis between input and output positions, means for generating a first in-plane field along said axis, and means for reversing said first in-plane field alternately at slow and fast rates for advancing said domain along said axis.

2. An arrangement in accordance with claim 1 also including means for generating a second in-plane field perpendicular to said axis.

3. An arrangement in accordance with claim 2 wherein said first in-plane field is large compared to said second in-plane field.

4. An arrangement in accordance with claim 3 wherein said element is a disc and said fast rate is fast with respect to $(R/\mu\Delta H)$ where R is the radius of said disc, $\xi$ is the mobility of a domain in said material, and $\Delta H$ is the difference between the field at the leading and at the trailing edges of said domain.

5. An arrangement in accordance with claim 4 where said slow rate is slow with respect to $(R/\mu\Delta H)$.